United States Patent
Ren et al.

(10) Patent No.: US 10,424,918 B2
(45) Date of Patent: Sep. 24, 2019

(54) FAULT CURRENT LIMITER

(71) Applicant: Huazhong University of Science and Technology, Wuhan (CN)

(72) Inventors: Li Ren, Wuhan (CN); Siyuan Liang, Wuhan (CN); Yuejin Tang, Wuhan (CN); Ying Xu, Wuhan (CN); Zhong Xia, Wuhan (CN); Zuoshuai Wang, Wuhan (CN); Jing Shi, Wuhan (CN); Jingdong Li, Wuhan (CN); Lihui Zhang, Wuhan (CN); Sinian Yan, Wuhan (CN); Zhangwei Yang, Wuhan (CN); Yi Zhang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 282 days.

(21) Appl. No.: 15/491,954

(22) Filed: Apr. 19, 2017

(65) Prior Publication Data

US 2018/0248362 A1 Aug. 30, 2018

(30) Foreign Application Priority Data

Feb. 27, 2017 (CN) .................... 2017 2 0175479 U

(51) Int. Cl.
*H02H 9/02* (2006.01)
*H01F 6/00* (2006.01)
*H01F 38/02* (2006.01)

(52) U.S. Cl.
CPC .............. *H02H 9/023* (2013.01); *H01F 6/00* (2013.01); *H01F 38/023* (2013.01); *H01F 2006/001* (2013.01); *Y02E 40/69* (2013.01)

(58) Field of Classification Search
CPC .... H02H 9/023; H02H 6/00; H01F 2006/001; Y02E 40/69
USPC ........................................................ 361/93.9
See application file for complete search history.

(56) References Cited

U.S. PATENT DOCUMENTS

2015/0236502 A1* 8/2015 Xu ..................... H02H 9/023
361/93.9

OTHER PUBLICATIONS

WO 2009/063150; System for creating a magnetic field via a superconducting magnet; Publication Date: May 22, 2009; Fig. 3, Drawings and Specification, abstract. (Year: 2009).*

* cited by examiner

*Primary Examiner* — Dharti H Patel
(74) *Attorney, Agent, or Firm* — Matthias Scholl P.C.; Matthias Scholl

(57) ABSTRACT

A fault current limiter, including: an inductor, a direct current circuit breaker, a shunt resistor, and a first fixed resistor. The inductor includes wound superconducting wires. The direct current circuit breaker and the inductor are connected in series to form a series branch. The shunt resistor is connected in parallel to the series branch. The first fixed resistor is connected in parallel to the direct current circuit breaker.

9 Claims, 8 Drawing Sheets

FAULT CURRENT LIMITER

CROSS-REFERENCE TO RELATED APPLICATIONS

Pursuant to 35 U.S.C. § 119 and the Paris Convention Treaty, this application claims the benefit of Chinese Patent Application No. 201720175479.1 filed Feb. 27, 2017, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a fault current limiter.

Description of the Related Art

High voltage direct current (DC) circuit breakers are considered to be one of the effective ways to solve the problem of short-circuit fault in DC power systems. However, with the rapid development of the power transmission network, the short-circuit current is increasingly large, and conventional high voltage DC circuit breakers are unable to interrupt the fault current. In addition, conventional high voltage DC circuit breakers have complex structure, high power loss, and are bulky.

Fault current limiters (FCLs) utilize superconducting materials to limit the fault current. In normal operation, current flows through the superconducting materials without resistance and negligible impedance. When a fault develops, the superconducting materials quench, the resistance rises sharply, and current is diverted to a parallel circuit with the desired higher impedance.

Conventional superconducting fault current limiters are described as being in one of two major categories: resistive or inductive.

Resistive fault current limiters have difficulty in limiting the short-circuit current peak and controlling the quenching process, thus adversely affecting the reliability of the devices.

Inductive fault current limiters have difficulty in suppressing steady-state short-circuit current, and require a large amount of iron, meaning that inductive FCLs are much bigger and heavier than resistive FCLs.

SUMMARY OF THE INVENTION

In view of the above-described problems, it is one objective of the invention to provide a hybrid superconducting fault current limiter.

Based on the characteristics of the resistive and the inductive superconducting fault current limiters, a topological structure of the hybrid superconducting fault current limiter including resistive components and inductive components is put forward to protect the DC system when the short-circuit fault occurs. The hybrid superconducting fault current limiter is capable of fast energy transfer, easy to engineer, has a compact structure, and exhibits outstanding performance index in cost, size, complexity, and response speed.

To achieve the above objective, in accordance with one embodiment of the invention, there is provided a hybrid superconducting fault current limiter, comprising an inductor, a direct current circuit breaker, a shunt resistor, and a first fixed resistor. The inductor comprises wound superconducting wires. The direct current circuit breaker and the inductor are connected in series to form a series branch. The shunt resistor is connected in parallel to the series branch. The first fixed resistor is connected in parallel to the direct current circuit breaker.

A conception of the invention comprises the topological structure of the hybrid superconducting fault current limiter. A current-limiting resistor of the hybrid superconducting fault current limiter is connected in parallel to a superconducting inductor, forming a main structure. When a fault develops, the inductor prevents the current from increasing, and the fault current is diverted to a resistor branch where the current-limiting resistor quickly takes effect, thus the peak current is quickly limited. In the main structure, the superconducting inductor is connected to the direct current circuit breaker in series, and the direct current circuit breaker is connected to the first fixed resistor in parallel. In normal operation of the DC system, the direct current circuit breaker is switched on, and the current flows through the series branch of the superconducting inductor. The fault current limiter works as a smoothing reactor. When a fault develops, the direct current circuit breaker is switched off, and the superconducting inductor works to divert the fault current to the shunt resistor so that the peak current is limited and the superconducting inductor is protected from damage caused by the fault current, meanwhile, the resistive component in the series branch ensures that the steady short-circuit current is also limited. Because the direct current circuit breaker is connected to the fixed resistor in parallel, the break voltage is suppressed, facilitating the switching of the direct current circuit breaker, and improving the stability of the switching. The direct current circuit breaker is light-weight, and the production cost is reduced.

In a class of this embodiment, the shunt resistor is a second fixed resistor.

In a class of this embodiment, the superconducting inductor is in a superconducting state when the hybrid superconducting fault current limiter is working.

In a class of this embodiment, the hybrid superconducting fault current limiter is disposed at a head or a tail of a DC transmission line.

In a class of this embodiment, the inductor is a hollow structure or comprises an iron core.

Advantages of the hybrid superconducting fault current limiter according to embodiments of the invention are summarized as follows:

1. Compared with the fault current limiter in the prior art, the hybrid superconducting fault current limiter of the invention is capable of fast energy transfer, easy to engineer, has a compact structure, and exhibits outstanding performance index in cost, size, complexity, and response speed. Based on the characteristics of the resistive and the inductive superconducting fault current limiters, a topological structure of the hybrid superconducting fault current limiter including resistive components and inductive components is put forward to protect the DC system when the short-circuit fault occurs. In normal operation of the DC system, the fault current limiter works as a smoothing reactor, and has no energy consumption. When a fault develops, the fault current limiter can obviously limit the current and works to compensate the voltage drop of the DC system. Because the superconducting inductor of the current limiter is connected to a shunt resistor in parallel, when a fault occurs, the fault current is quickly diverted to the resistor branch, and the peak current is limited. When the direct current circuit breaker is switched off, the current limiting function of the current limiter can be further improved, and the steady short-circuit current is limited. The superconducting inductor is unlikely to quench during the current limiting process, thus ensuring the security and stability of the superconducting structure.

2. The hybrid superconducting fault current limiter based on fast energy transfer can be applied to DC low-voltage lines and DC high-voltage transmission lines, and can respond to monopolar grounding fault and bipolar short-circuit fault, thus the requirements for fault current limiter as an important device for power grid construction under the condition that the short-circuit capacity of the power grid are increasing are satisfied, and relay protection configuration and stability of the DC system are maintained, meanwhile, the transient stability and the security in the steady state of the power grid are ensured.

3. The hybrid superconducting fault current limiter of the invention is capable of fast energy transfer, easy to engineer, has a compact structure, and exhibits outstanding performance index in cost, size, complexity, and response speed.

BRIEF DESCRIPTION OF THE DRAWINGS

The invention is described hereinbelow with reference to the accompanying drawings, in which:

FIGS. 2A-2C are operating diagrams of a hybrid superconducting fault current limiter in accordance with one embodiment of the invention; in which, FIG. 2A is a diagram showing current flow in the hybrid superconducting fault current limiter during a normal operation of a DC system; FIG. 2B is a diagram showing current flow in the hybrid superconducting fault current limiter before a direct current circuit breaker is switched off when a short-circuit fault occurs in the DC system ($t=t_1$); and FIG. 2C is diagram showing current flow in the hybrid superconducting fault current limiter after the direct current circuit breaker is switched off when a short-circuit fault occurs in the DC system ($t=t_2=t_1+\Delta t$);

DETAILED DESCRIPTION OF THE EMBODIMENTS

Figure 1:
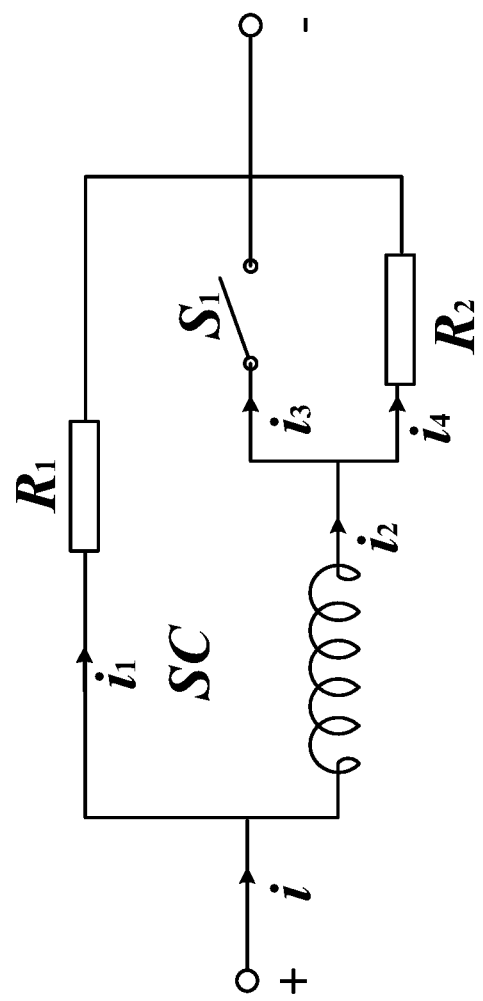
FIG. 1 is a diagram of a topological structure of a hybrid superconducting fault current limiter in accordance with one embodiment of the invention.

For further illustrating the invention, experiments detailing a hybrid superconducting fault current limiter are described below. It should be noted that the following examples are intended to describe and not to limit the invention.

A hybrid superconducting fault current limiter comprises an inductor, a direct current circuit breaker, a shunt resistor, and a first fixed resistor. The inductor comprises wound superconducting wires. The direct current circuit breaker and the inductor are connected in series to form a series branch. The shunt resistor is connected in parallel to the series branch. The first fixed resistor is connected in parallel to the direct current circuit breaker.

In a class of this embodiment, the main structure of the fault current limiter comprises the inductor and the current-limiting resistor. The inductor and the current-limiting resistor are connected in parallel and form two branches on which the current flows. The inductor comprises wound superconducting wires. The inductor is a hollow structure or the inductor comprises an iron core. The current-limiting resistor is a second fixed resistor. In operation, the inductor in the fault current limiter is always in the superconducting state.

In a class of this embodiment, the superconducting inductor is connected to the direct current circuit breaker in series to form the series branch, and in the series branch the direct current circuit breaker is connected to the first fixed resistor in parallel. When no fault occurs in a direct current (DC) system, the direct current circuit breaker is switched on, and the first fixed resistor which is connected in parallel to the direct current circuit breaker is short-circuit. In the DC system, the branch of the current-limiting resistor is short-circuit because the series branch has no resistive component, thus steady-state direct current only flows through the series branch which has the superconducting inductor. The fault current limiter has no resistive component at the moment, and the consumption is low and can be neglected, meanwhile, the superconducting inductor works as a smoothing reactor. When a short-circuit fault develops, the fault current limiter can quickly limit the peak current and compensate for the voltage drop of the DC system, meanwhile, the direct current circuit breaker is switched off, so that the peak current and steady short-circuit current are both limited.

In a class of this embodiment, when the short-circuit fault occurs, compared with the direct current circuit breaker having no parallel connection to the first fixed resistor, the direct current circuit breaker in the superconducting fault current limiter is connected to the first fixed resistor in parallel, and the first fixed resistor works to suppress the break voltage of the direct current circuit breaker when the direct current circuit breaker is switching off, thus lowering the peak value of the break voltage, facilitating the switching of the direct current circuit breaker, reducing the switching capacity of the direct current circuit breaker, and decreasing the production cost thereof to a large extent.

In a class of this embodiment, the hybrid superconducting fault current limiter is disposed at a head or a tail of a DC transmission line.

The working principle of the hybrid superconducting fault current limiter is as follows:

During the normal operation of the DC system, the fault current limiter provides a superconducting inductor which works as a smoothing reactor to reduce AC ripple component and remove a part of the harmonics, meanwhile ensuring that the smoothing reactor has no resistive consumption.

When a monopolar grounding fault or a bipolar short-circuit fault occurs in the DC system, the hybrid superconducting fault current limiter responds quickly. Based on the parallel structure of the inductor and the current-limiting resistor and the principle that the inductive current cannot change abruptly, at the moment the fault occurs, the current is quickly diverted to the shunt resistor in the DC system with higher equivalent current-limiting impedance so that the peak current is effectively limited. The shunt resistor provides a transfer branch for the short-circuit current and reduces the current shock of the inductor. The direct current circuit breaker is connected to the first fixed resistor in parallel, when the direct current circuit breaker is switched off, the first fixed resistor takes effect and prevents the superconducting inductor from quenching, and thus the security and stability of the inductor are ensured. The first fixed resistance works to suppress the break voltage, thus lowering the break voltage of the direct current circuit breaker, facilitating the switching of the direct current circuit breaker, and enhancing the stability of the on-off action of the direct current circuit breaker.

The hybrid superconducting fault current limiter in the example is further illustrated as follows:

FIG. 1 is a diagram of a topological structure of the hybrid superconducting fault current limiter based on fast energy transfer, as shown in FIG. 1, the topological structure of the hybrid superconducting fault current limiter comprises two fixed resistor $R_1$ and $R_2$, a superconducting inductor L, and a direct current circuit breaker $S_1$. The fixed resistor $R_1$ is a current-limiting resistor and works as a shunt resistor. The inductor L works as the smoothing reactor. Two ends of the direct current circuit breaker $S_1$ are connected to the fixed resistor $R_2$ in parallel, thus over-voltage is suppressed, and the break voltage of the direct current circuit breaker $S_1$ is lowered. The parallel connection between the direct current circuit breaker $S_1$ and the fixed resistor $R_2$ can lower the overcurrent in the superconducting inductor L and prevent the superconducting inductor from quenching.

Figure 2A:
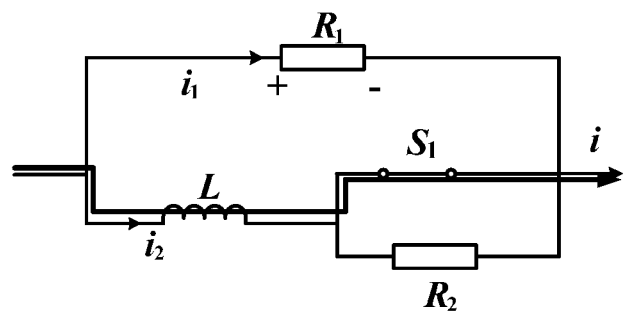
Figure 2B:
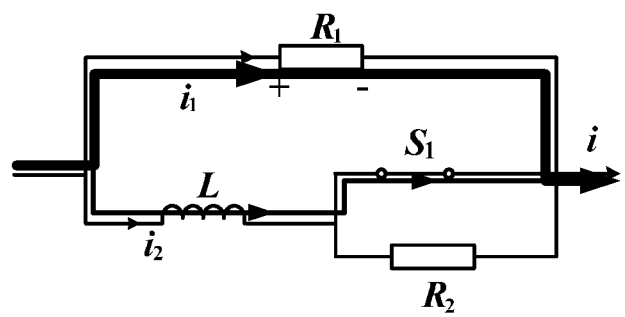
Figure 2C:
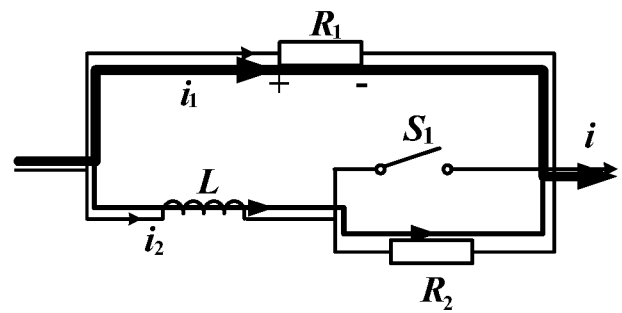

FIGS. 2A-2C is operating diagrams of the hybrid superconducting fault current limiter based on fast energy transfer; in which, FIG. 2A is a diagram showing current flow in the hybrid superconducting fault current limiter during a normal operation of a DC system; FIG. 2B is a diagram showing current flow in the hybrid superconducting fault current limiter before the direct current circuit breaker is switched off when a short-circuit fault develops in the DC system ($t=t_1$); and FIG. 2C is diagram showing current flow in the hybrid superconducting fault current limiter after the direct current circuit breaker is switched off when the short-circuit fault develops in the DC system ($t=t_2=t_1+\Delta t$). As shown in FIG. 2A, during normal operation of the DC system, no fault develops, and the direct current circuit breaker $S_1$ is switched on. The current in the DC system only flows through the superconducting inductor L. In the DC system, as the superconducting inductor is in the superconducting state, the superconducting inductor has no resistive voltage, thus the fault current limiter in the superconducting state under 77 K of liquid nitrogen condition has no energy consumption. Low energy consumption facilitates the long-term operation of electrical equipment in series with the DC system. The superconducting inductor in series with the DC system can work as the smoothing reactor, thus reduces the AC ripple component and removes a part of the harmonic component. The communication jamming on the transmission lines is reduced, and unstable harmonic conditioning is avoided.

As shown in FIG. 2B, when $t=t_1$, a short-circuit fault develops in the DC system, and the hybrid superconducting fault current limiter is in the current-limiting state I. As the inductive current $i_2$ cannot change abruptly, the current rise in the inductor is hindered, and most of the short-circuit current $i_1$ is diverted to the shunt resistor $R_1$. As the inductor hinders the current variation, the shunt resistor $R_1$ automatically takes effect and the shunt resistor $R_1$ limits the peak current. Under this circumstance, the short-circuit current has two components: $i_1$ and $i_2$, and $i_1 > i_2$.

As shown in FIG. 2C, $\Delta t$ is the fault detection time. After $\Delta t$, the direct current circuit breaker $S_1$ is switched off at $t_2$, thus the current component $i_2$ which flows through the superconducting inductor is limited and the superconducting inductor L is prevented from quenching. The voltage of the inductor is lowered due to the fixed resistor $R_2$. Meanwhile, the over-voltage at two ends of the direct current circuit breaker $S_1$ is suppressed by the fixed resistor $R_2$, thus the amplitude of the break voltage is limited. Under this circumstance, the fixed resistors $R_1$ and $R_2$ and the superconducting inductor L are all connected to the DC system to limit the current. As the fault current limiter features both resistive component and inductive component, the fault current limiter is hybrid.

Figure 3:
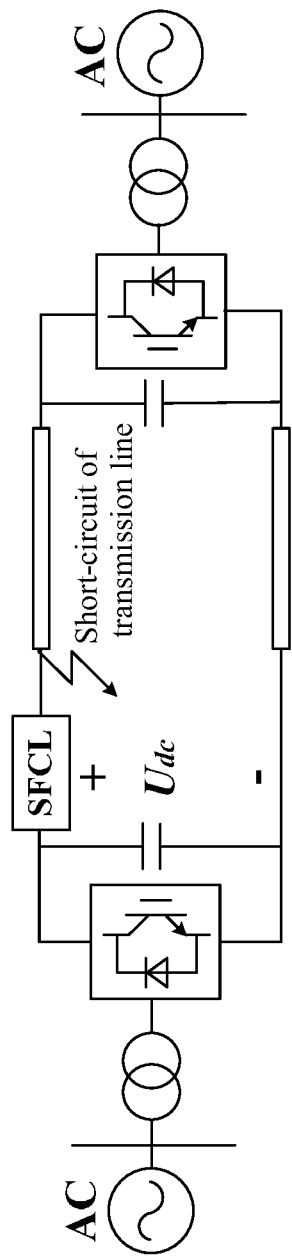
FIG. 3 is a circuit diagram showing a connection between a hybrid superconducting fault current limiter and a high-voltage DC transmission system in accordance with one embodiment of the invention.

FIG. 3 is a circuit diagram showing a connection between the hybrid superconducting fault current limiter based on fast energy transfer and a high-voltage DC transmission system. As shown in FIG. 3, an application of the hybrid superconducting fault current limiter involves in a simple VSC high-voltage DC transmission system. The fault current limiter is mounted on an end of the transmission line. Assuming that a grounding fault develops at an end of the transmission line at $t_1=2$ s, after 5 ms, at $t_2$, the direct current circuit breaker $S_1$ of the fault current limiter is switched off.

Figure 4:
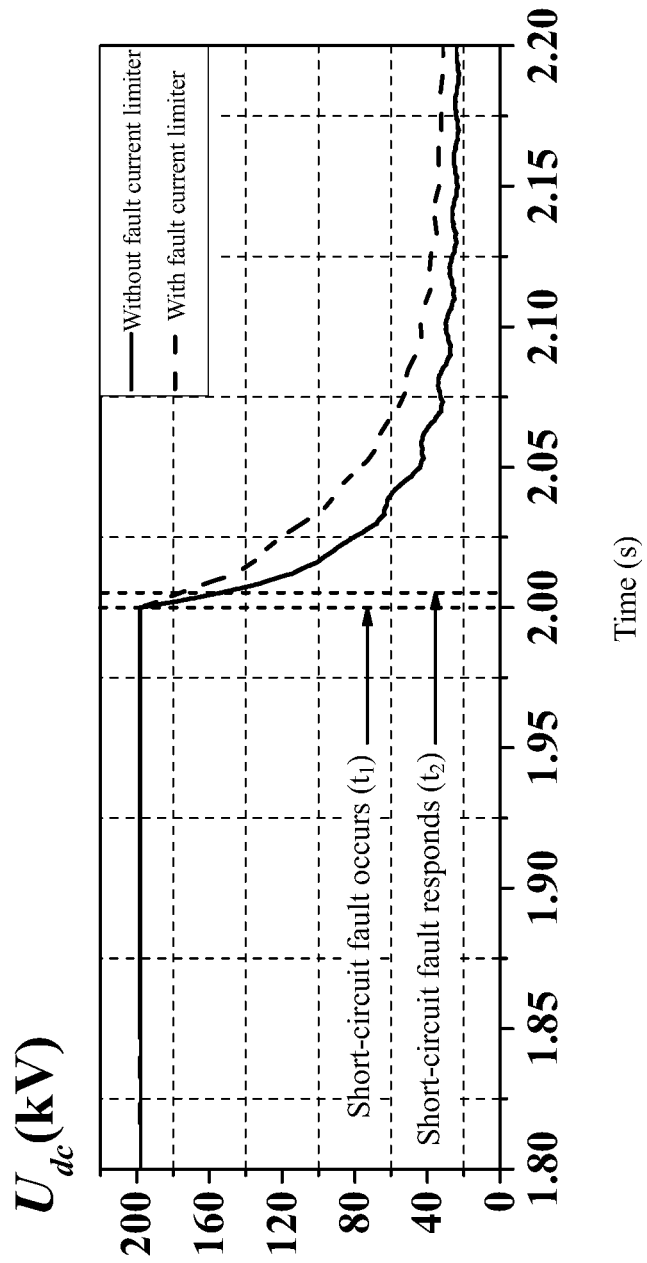
FIG. 4 is a comparison diagram of DC voltage variations in a high-voltage DC transmission system with and without a hybrid superconducting fault current limiter when a monopolar grounding fault develops in accordance with one embodiment of the invention.

FIG. 4 is a comparison diagram of DC voltage variations in the high-voltage DC transmission system with and without the hybrid superconducting fault current limiter when a monopolar grounding fault develops; or FIG. 4 is an oscillogram of the DC voltage $U_{DC}$ at an end of the DC system. According to the comparison in FIG. 4, after the fault occurs, the fault current limiter can compensate the voltage drop in the DC system at a certain extent, and slower the voltage drop.

Figure 5:
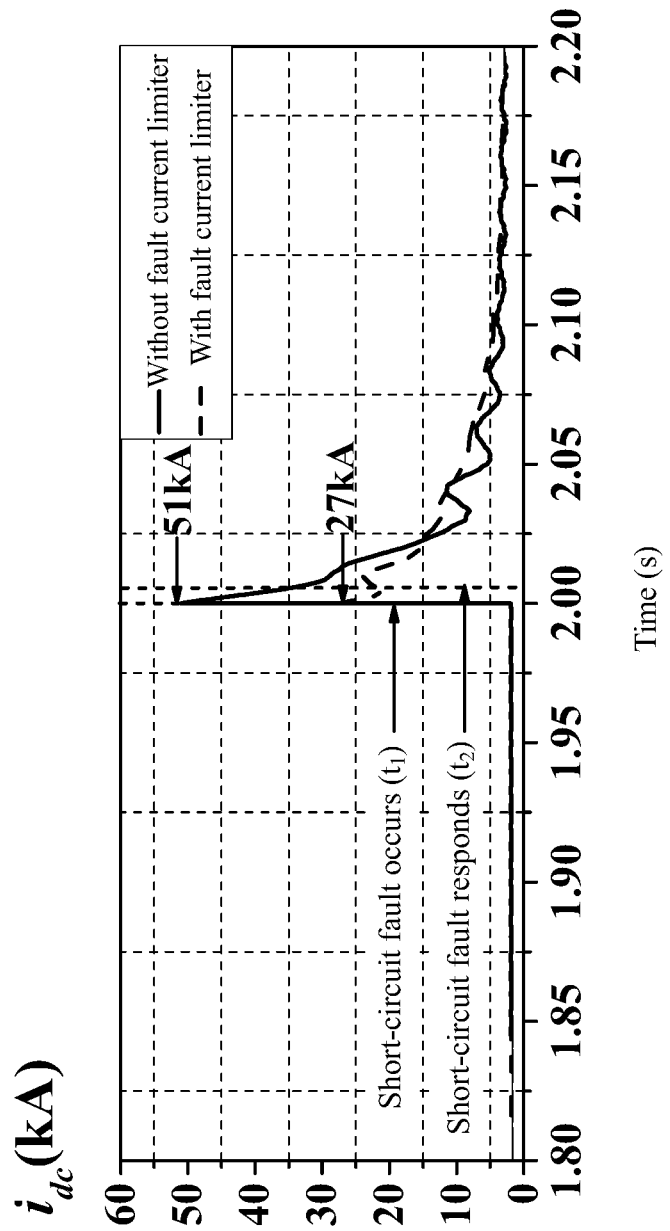
FIG. 5 is a comparison diagram of direct current variations in a high-voltage DC transmission system with and without a hybrid superconducting fault current limiter when a monopolar grounding fault develops in accordance with one embodiment of the invention.

FIG. 5 is a comparison diagram of direct current variations in the high-voltage DC transmission system with and without the hybrid superconducting fault current limiter when a monopolar grounding fault develops; or FIG. 5 is an oscillogram of direct current in the transmission line. As shown in FIG. 5, the fault current limiter can obviously limit the current when short-circuit fault develops, and the peak current drops from 51 kA to 27.6 kA. The rate of short-circuit current limit reaches 45.9%.

Figure 6:
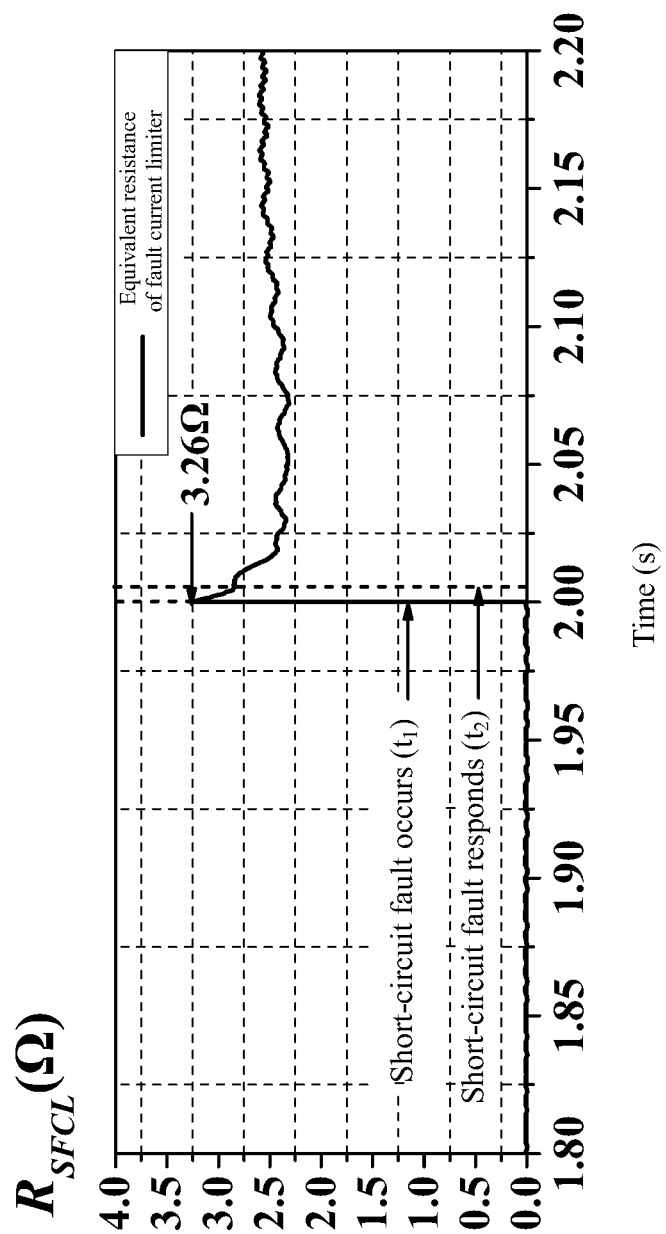
FIG. 6 is a diagram showing variation of equivalent current-limiting resistance of a hybrid superconducting current limiter when a monopolar grounding fault develops in a high-voltage DC transmission system in accordance with one embodiment of the invention.

FIG. 6 is a diagram showing variation of equivalent current-limiting resistance of the hybrid superconducting current limiter when the monopolar grounding fault develops in the high-voltage DC transmission system; or FIG. 6 is a change curve of equivalent resistance of the fault current limiter. As shown in FIG. 6, the fault current limiter responds quickly, when the fault occurs, the equivalent resistance increase from 0Ω to 3.26Ω. When the equivalent resistance of the fault current limiter is 0Ω, the resistive voltage of the fault current limiter is 0 V, thus the fault current limiter has barely no energy consumption. When the equivalent resistance of the fault current limiter is high, the short-circuit current can be effectively limited by the fault current limiter.

Figure 7:
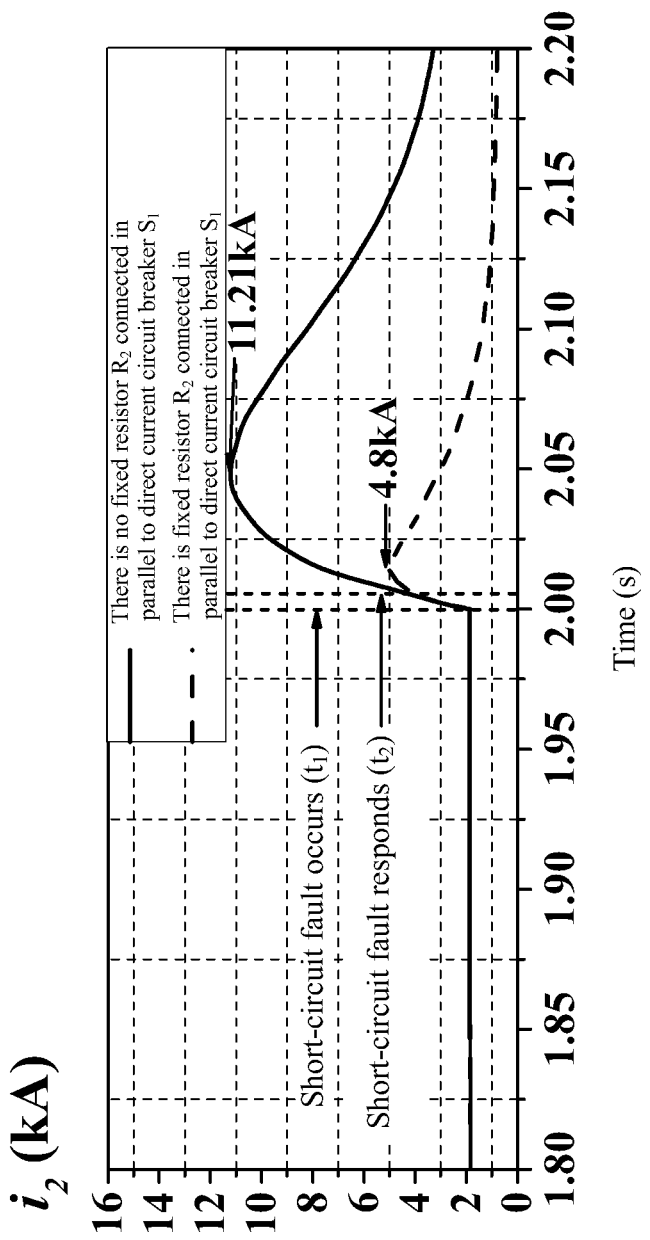
FIG. 7 is a comparison diagram showing current variations in a superconducting inductor having and not having a series connection to a direct current circuit breaker which is connected to a fixed resistor in parallel when a monopolar grounding fault develops in a high-voltage DC transmission system in accordance with one embodiment of the invention.

FIG. 7 is a comparison diagram showing current variations in the superconducting inductor having and not having a series connection to the direct current circuit breaker which is connected to the fixed resistor in parallel when the monopolar grounding fault develops in the high-voltage DC transmission system. Due to the shunting effect the fixed resistor $R_1$, the fault current component in the superconducting inductor is far less than the total fault current. The superconducting inductor is connected to the fixed resistor $R_2$ in series, and the fixed resistor is connected to the direct current circuit breaker $S_1$ in parallel, thus the fault current component in the superconducting inductor is effectively limited. If the superconducting inductor has no series connection to the direct current circuit breaker $S_1$ which is connected to the fixed resistor $R_2$ in parallel, when a short-circuit fault develops, the peak current in the superconducting inductor reaches 11.21 kA due to the fault current component, and the current shock causes the superconducting inductor to quench and breakdown. However, when the superconducting inductor has a series connection to the direct current circuit breaker $S_1$ which is connected to the fixed resistor $R_2$ in parallel, at 5 ms after the short-circuit fault develops, the direct current circuit breaker $S_1$ is switched off, and the fixed resistor $R_2$ takes effect. The fault current in superconducting inductor is limited, and the peak current in the inductor is only 4.8 kA, if the critical current of the superconducting inductor is 5 kA, when the short-circuit fault develops, the superconducting inductor would not quench. One advantage of the topological structure of the fault current limiter is that a superconducting inductor with relatively low critical current can be used to limit relatively high short-circuit current in the DC system.

Figure 8:
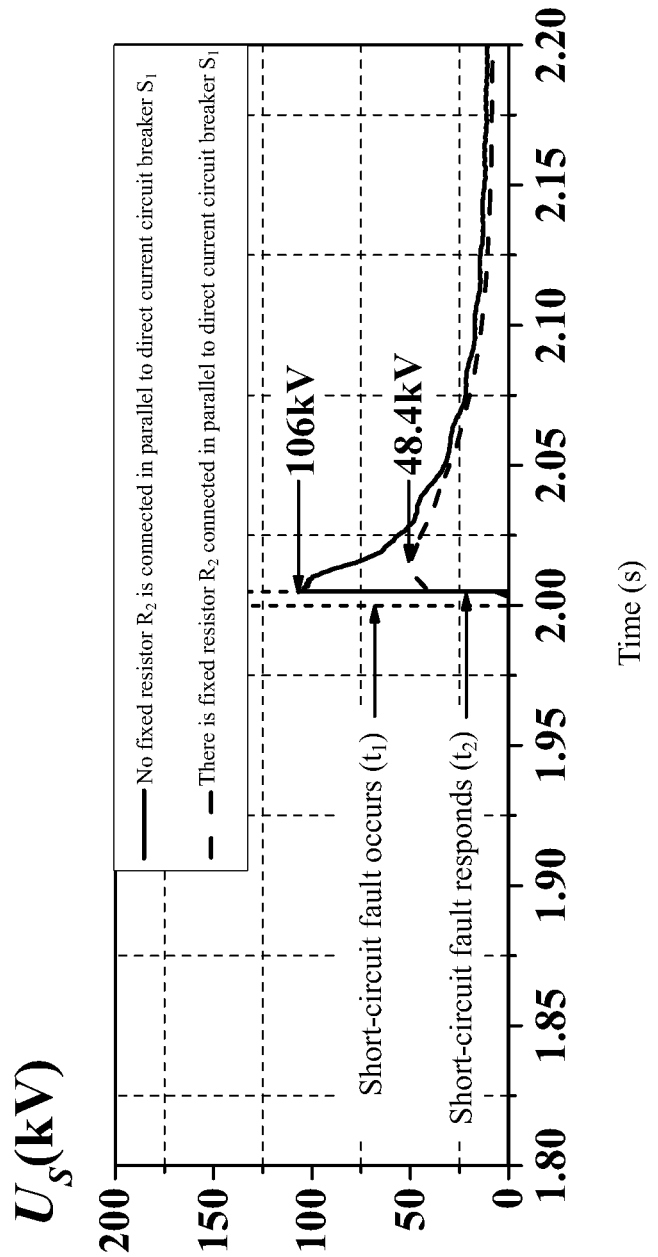
FIG. 8 is comparison diagram showing break voltage variations of a direct current circuit breaker having and not having a parallel connection to a fixed resistor when a monopolar grounding fault develops in a high-voltage DC transmission system in accordance with one embodiment of the invention.

FIG. 8 is a comparison diagram showing break voltage variations of the direct current circuit breaker having and not having a parallel connection to the fixed resistor when a monopolar grounding fault develops in the high-voltage DC transmission system. As shown in FIG. 8, when the direct current circuit breaker $S_1$ has no connection to the fixed resistor $R_2$, the break voltage reaches 106 kV. However, when the direct current circuit breaker $S_1$ is connected to the fixed resistor $R_2$, the fixed resistor $R_2$ works to suppress the break voltage of the direct current circuit breaker $S_1$ as the direct current circuit breaker $S_1$ is switched off, and the break voltage is limited to be 48.4 kV, thus facilitating the switching of the direct current circuit breaker $S_1$, ensuring the effectiveness of the switching of the direct current circuit breaker $S_1$, and reducing the production cost of the direct current circuit breaker.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A fault current limiter, comprising:
   an inductor;
   a direct current circuit breaker;
   a shunt resistor; and
   a first fixed resistor;
   wherein
   the inductor is a superconducting inductor;
   the inductor comprises wound superconducting wires;
   the direct current circuit breaker and the inductor are connected in series to form a series branch;
   the shunt resistor is connected in parallel to the series branch; and
   the first fixed resistor is connected in parallel to the direct current circuit breaker.

2. The fault current limiter of claim 1, wherein the shunt resistor is a second fixed resistor.

3. The fault current limiter of claim 1, wherein the inductor is in a superconducting state when the fault current limiter is working.

4. The fault current limiter of claim 2, wherein the inductor is in a superconducting state when the fault current limiter is working.

5. The fault current limiter of claim 3, wherein the fault current limiter is disposed at a head or a tail of a direct current transmission line.

6. The fault current limiter of claim 4, wherein the fault current limiter is disposed at a head or a tail of a direct current transmission line.

7. The fault current limiter of claim 5, wherein the inductor is a hollow structure or comprises an iron core.

8. The fault current limiter of claim 6, wherein the inductor is a hollow structure or comprises an iron core.

9. The fault current limiter of claim 1, wherein the fault current limiter is configured to prevent quench of the superconducting inductor.

* * * * *